United States Patent [19]

Iwase

[11] Patent Number: 5,064,128

[45] Date of Patent: Nov. 12, 1991

[54] WIRE GUIDING APPARATUS IN COIL WINDING MACHINE

[75] Inventor: Hideaki Iwase, Toyohashi, Japan

[73] Assignee: Asmo Co., Ltd., Shizuoka, Japan

[21] Appl. No.: 474,335

[22] Filed: Feb. 2, 1990

[30] Foreign Application Priority Data

Feb. 3, 1989 [JP] Japan ................................. 1-26086

[51] Int. Cl.$^5$ .................................... H02K 15/04
[52] U.S. Cl. .................................. 242/7.05 B; 29/596
[58] Field of Search ..................... 242/7.05 R, 7.05 B, 242/7.11, 7.14; 29/596, 732, 736

[56] References Cited

U.S. PATENT DOCUMENTS

| 4,520,965 | 6/1985 | Kimura et al. | 242/7.05 B |
| 4,579,291 | 4/1986 | Lombardi et al. | 242/7.05 B |
| 4,616,788 | 10/1986 | Finegold | 242/7.03 |

FOREIGN PATENT DOCUMENTS

| 60-5724 | 2/1985 | Japan . | |
| 810112 | 3/1959 | United Kingdom | 242/7.05 B |

Primary Examiner—Daniel P. Stodola
Assistant Examiner—William G. Battista, Jr.
Attorney, Agent, or Firm—Burns, Doane, Swecker & Mathis

[57] ABSTRACT

A wire guiding apparatus in a coil winding machine which is adapted to continuously wind a wire around an armature core with a slot provided therein from a flier, wherein a pair of receiving rollers that come into contact on both the upper, lower sides with respect to the outer peripheal faces on both the right, left sides of the iron core are provided, the pair of receiving rollers are mounted on the main body side for their mutually opening, closing operations, the receiving rollers are adapted to be operated in contact with the outer peripheral face of the iron core so as to be opened, closed and also, to be locked in the set position of the iron core when the outer diameter of the iron core has been varied, and a pair of wire guides for guiding the wire into the slot of the iron core from the flier are provided for their mutually opening, closing operations, the wire guide is operated, tracing the outer diameter variation in the iron core to be opened, closed so as to be conformed into the slot position of the iron core.

19 Claims, 14 Drawing Sheets

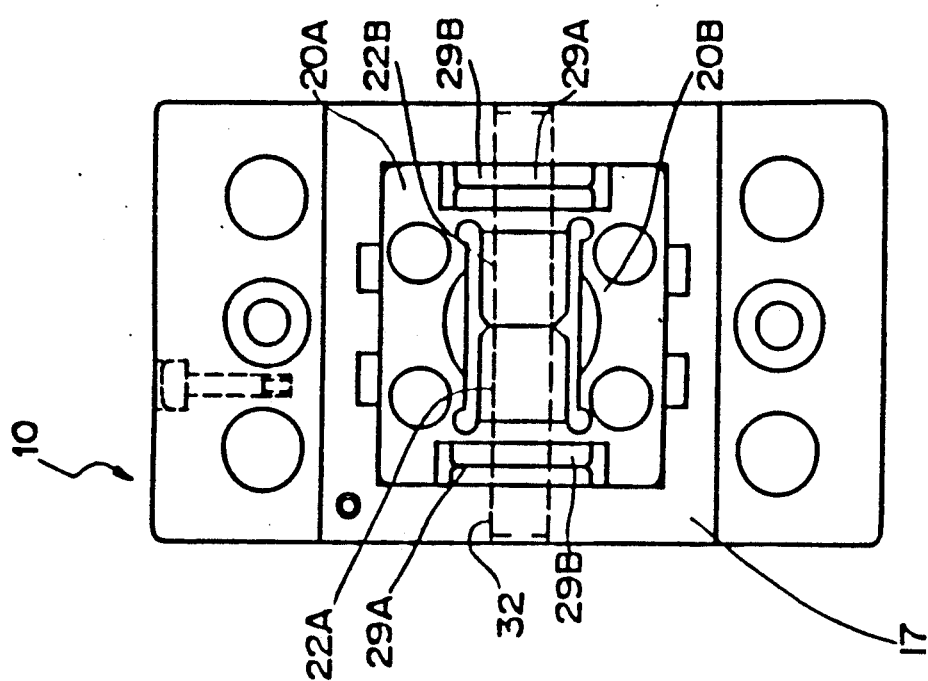
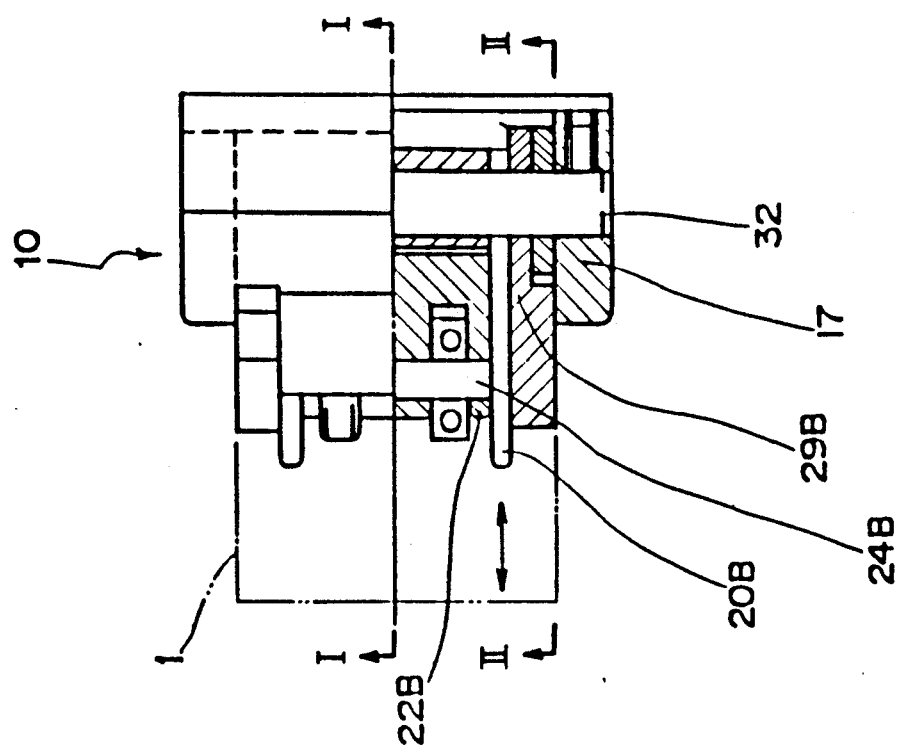

WIRE GUIDING APPARATUS IN COIL WINDING MACHINE

BACKGROUND OF THE INVENTION

The present invention generally relates to a wire guiding apparatus in a coil winding machine, and more particularly, in a wire guiding apparatus for a flier coil winding machine to be used as a coil winding machine for winding coils around an armature core of a motor, the same coil guiding apparatus may be used without exchange if the diameter of the armature core changes.

Conventionally a flier wire machine 2 shown in FIG. 23 is used to wind coils around the armature core of a motor shown in FIG. 22. In the flier winding machine 2, a bearing housing 5 is slidably mounted on a pair of support members 4 disposed on a horizontal table 3 so as to rotatably support the main shaft 6 by each bearing housing 5. A flier 7 is secured on these main shafts 6, and also, the wire guide 8 is mounted at the tip end through the bearing, a concave portion 8a formed on a pair of wire guides 8 is grasped through the external engagement with the outer peripheral portions of the armature core 1, with a wire 9 being inserted into a slot 1a formed in the outer peripheral face of the armature iron core 1 in the condition.

In the conventional wire guiding apparatus shown in FIG. 23 and FIG. 24, the wire guide 8 is required to be exchanged for a proper one when the shape of the concave portion 8a of the wire guide 8 for grasping the core 1 does not correspond to the core outer diameter if the outer diameter thereof is different as the armature core (hereinafter referred to as core).

In this manner, the wire guide has to be exchanged for a proper size one every time the outer diameter of the core changes, with a problem that more time is required for the exchange adjustment, so that improvement in the operation efficiency cannot be effected.

SUMMARY OF THE INVENTION

Accordingly, an object of the present invention is to provide a wire guiding apparatus in a coil winding machine, wherein a wire guide is adapted to grasp and trace the core outer diameter with the same wire guide if the core outer diameter is different so that changing of the wire guide which is different to accommodate the core outer diameter is not required.

In accomplishing the object, according to one preferred embodiment of the present invention, there is provided a wire guiding apparatus in a coil winding machine which is adapted to continuously wind a wire around an armature core with a slot provided therein from a flier, and which is characterized in that a pair of receiving rollers come into contact on both sides with respect to the outer peripheral faces on both sides of the iron core are provided, the pair of receiving rollers are mounted on the main body side for their mutually opening and closing operations, the receiving rollers are adapted to be operated in contact with the outer peripheral face of the iron core so as to be opened and closed and also, to be locked in the set position of the iron core when the outer diameter of the iron core has been varied, and a pair of wire guides for guiding the wire into the slot of the iron core from the flier are provided for their mutually opening and closing operations, the wire guide is operated, tracing the outer diameter variation in the iron core so as to conform into the slot position of the iron core.

Further, the present invention provides an apparatus, wherein a pair of receiving rollers and a pair of wire guides are provided respectively on both sides of the armature iron core, the respective rollers are rotatably supported through shafts by the front ends of a pair of levers, and also, the rear ends of these levers are rotatably mounted on the main body by a common shaft so that the receiving rollers are opened and closed for tracing the core outer diameter, and the respective wire guides are also mounted on the ends of a pair of levers, the rear end portions of the above-described levers are pivotally mounted on the main body by the common shaft to allow the wire guides to be mutually opened and closed for tracing the outer diameter of the core, further long holes are provided in the levers mounted on these wire guides, and also, the shafts of the receiving rollers are slidably engaged into the long holes so that the shafts of the receiving rollers come into contact with ends of the long holes so as to stop, with a clearance, in the required position where the tip end of the wire guide is conformed to the slot of the iron core.

Further, the present invention includes an apparatus, wherein a means for locking, in accordance with the core outer diameters of a small diameter core and a large diameter core, a pair of levers which support the pair of receiving rollers to make it possible to open and close them. For example, a slider is slidably engaged with the main body and urged onto the side of the core by a spring, the lock roller for locking the lever is mounted on the slider in a position for retaining a small diameter core, the lock by the lock roller is released by the slider tip end movement through the contact with the core, and a stopper for stopping the lever in the maximum open position is provided in the retaining position of a large diameter core so as to effect the locking operation.

Also, the present invention includes an apparatus, wherein a pair of levers for supporting the pair of receiving rollers are respectively urged in the closing directions by a coil spring, the pair of receiving rollers may be opened and closed in accordance with the changes in the core outer diameter, and are retained by the spring force of the coil spring in the position corresponding to the core outer diameter.

Further, the present invention includes an apparatus in a coil winding machine where the main shaft with the flier being secured to it traverses, in the axial direction. The main body of the wire guide apparatus is mounted through a pin and a spring with respect to a support plate mounted on the main shaft, the position with respect to the receiver roller and the wire guide core outer diameter by the spring force is positioned even at the axial movement of the main shaft.

As shown in the above description, in the present apparatus, the receiving roller and the wire guide move, effecting a tracing operation in accordance with the outer diameter of the armature core, and is locked in the required set position, so that it is not necessary to change the wire guide apparatus even if the outer diameter of the armature core is changed.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a partial sectional plane view showing a wire guide mechanism in accordance with the first embodiment;

FIG. 4 (B) is a left side face view of FIG. 3 (wherein it is mounted on the wire guide 28 A side, but mounted on 28 B side);

DETAILED DESCRIPTION OF THE INVENTION

Figure 1:
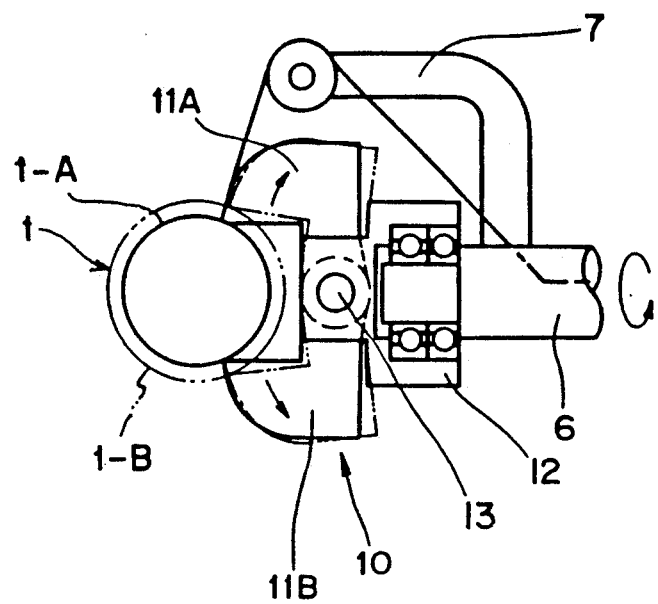
FIG. 1 is a schematic view showing a principle construction of a wire guiding apparatus of the present invention.

Before the description of the present invention proceeds, it is to be noted that like parts are designated by like reference numerals throughout the accompanying drawings.

A principle of the present invention will be described hereinafter with reference to a schematic view showing FIG. 1. Each of a pair of wire guide mechanisms 10 which respectively support both sides of an armature iron core (hereinafter referred to as core) is divided into two sections, a first portion 11A, and a second portion 11B. The first portion 11A and the second portion 11B are rotatably mounted through a shaft 13 on a main body 12 mounted on the main shaft 6, so that the wire guide portion on the tip end side of the first portion 11A and the second portion 11B may be opened and closed. Thus, when the outer diameter of the core 1 is small, as shown by core 1-A (in the drawing, it is shown in a solid line) the tip end wire guide portions of the first portion 11A and the second portion 11B are closed. In the case of the core having an increased diameter, the core 1-B (in the drawing, it is shown in a chain line) the tip end wire guide portions of the first portion 11A and the second portion 11B open along the outer peripheral face of the core of the increased diameter core, the first portion 11A and the second portion 11B automatically trace the core outer diameter. The first portion 11A and the second portion 11B stop in the given position to grasp the core 1 having the increased diameter.

FIG. 2 through FIG. 10 show a first embodiment of the present invention. In the first embodiment, in order to improve the winding of the wire 9 with respect to the core 1, and also to improve the performance of the number of the windings onto the core, the main shaft 6 is moved in the axial direction during the wire winding, and the flier 7, secured onto the main shaft 6, is adapted to move (traverse) in the axial direction to cope with changes in the outer diameter of the core 1.

Figure 2:
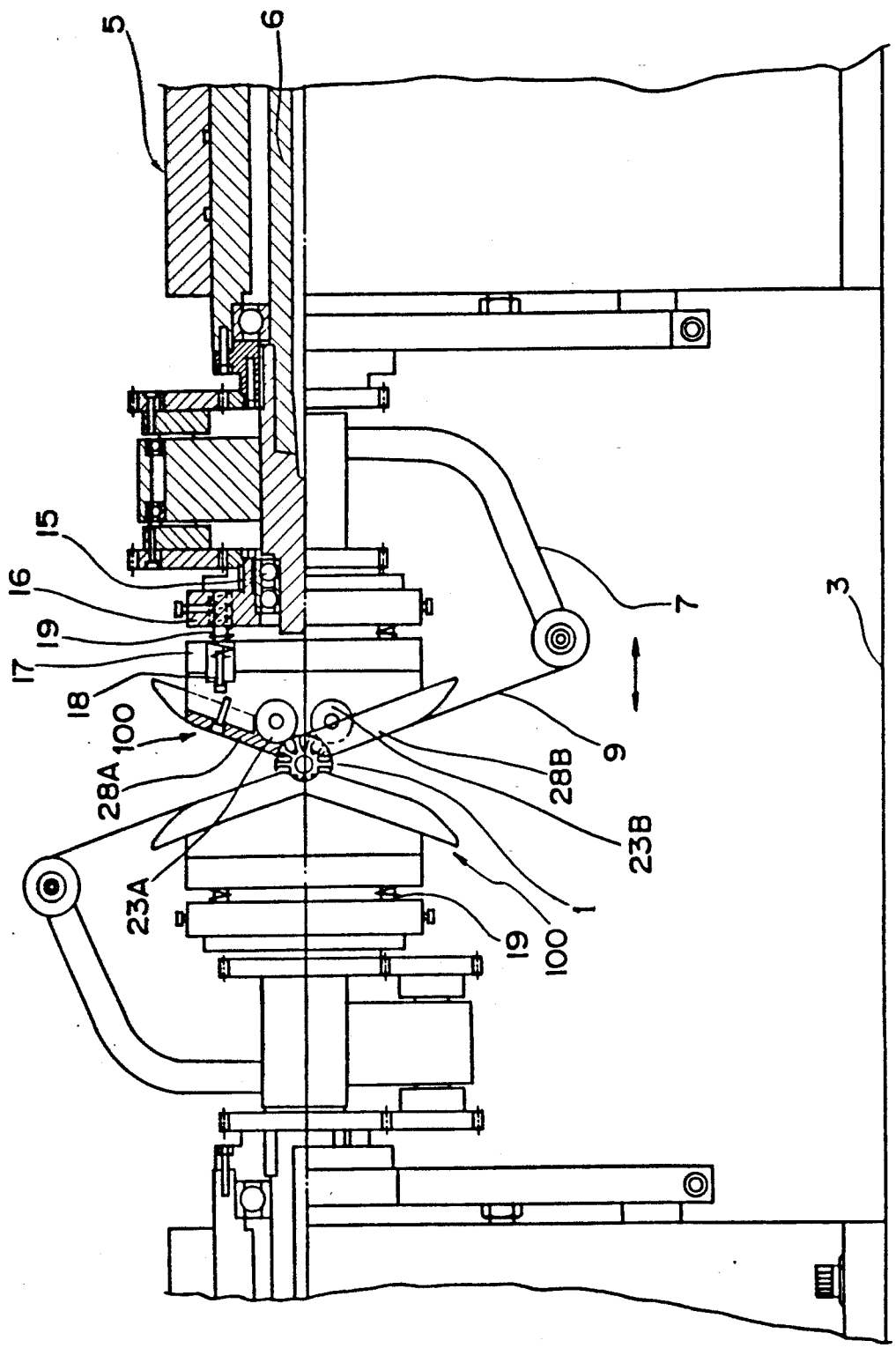
FIG. 2 is a whole front face view of a double flier coil winding machine showing a first embodiment of the present invention.
Figure 23:
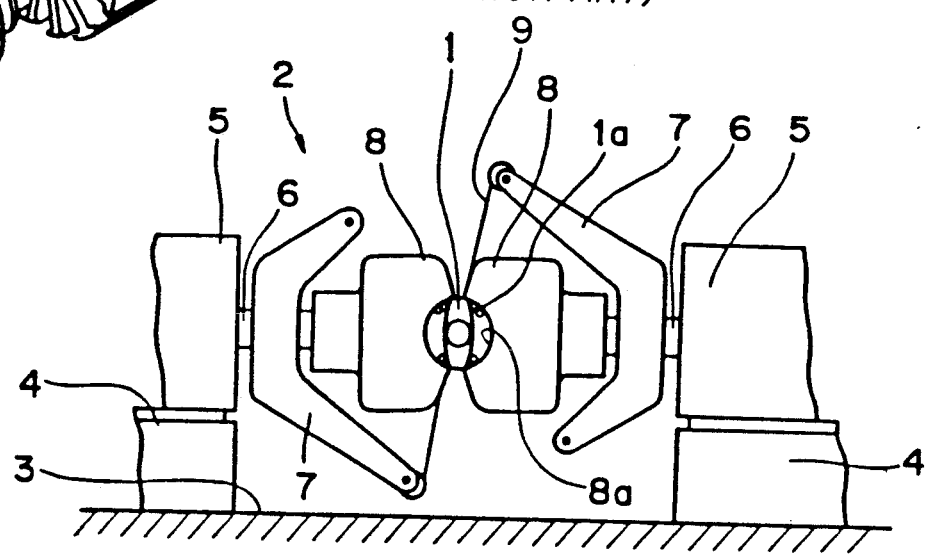
FIG. 23 is a schematic of the conventional flier coil winding machine.
Figure 24:
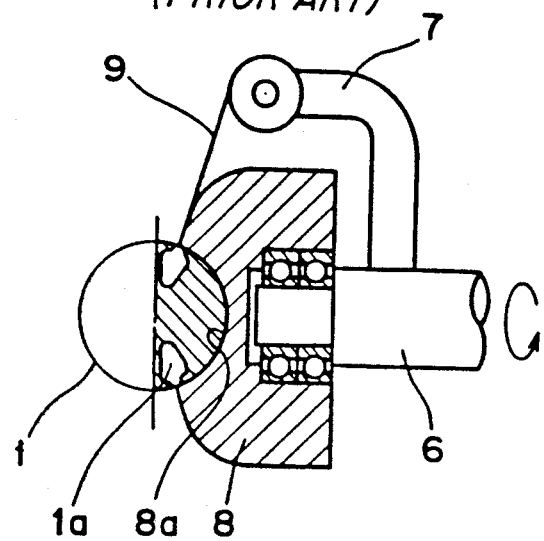
FIG. 24 is a schematic view for illustrating the defect of the conventional wire guiding apparatus.

FIG. 2 shows the construction of the complete core winding machine. The members which are the same as those of the conventional embodiments shown in above-described FIG. 23 are given the same reference numerals so as to omit the description.

A support member 16 is rotatably mounted through a bearing 15 on the tip end of the main shaft 6 which is supported by the bearing housing 5. The main body 17 of the wire guide mechanism 100 is mounted through the pin 18 and the spring 19 on the support member 16. Each portion of the above-described mechanism 100 is urged toward one another in a mutually approaching direction by the spring 19. Thus, when the flier 7 has traversed in the axial direction as shown by the arrow mark in the drawing in order to improve the winding performance, the wire guide mechanism 100 is urged onto the core 1 by the above-described spring 19 to retain the core 1 in a position with respect to the core outer diameter of the wire guide a described hereinabove for the winding of the wire 9 by the flier 7 secured on the main body 6.

The wire guide mechanism 100 of the wire machine is of a construction as shown from FIG. 3 to FIG. 6, and is provided with an opening and closing mechanism for receiving cores of a small diameter and a large diameter, a lock mechanism of the work receiving roller, and an opening and closing mechanism of the wire guide for guiding the wire 9.

Figure 5:
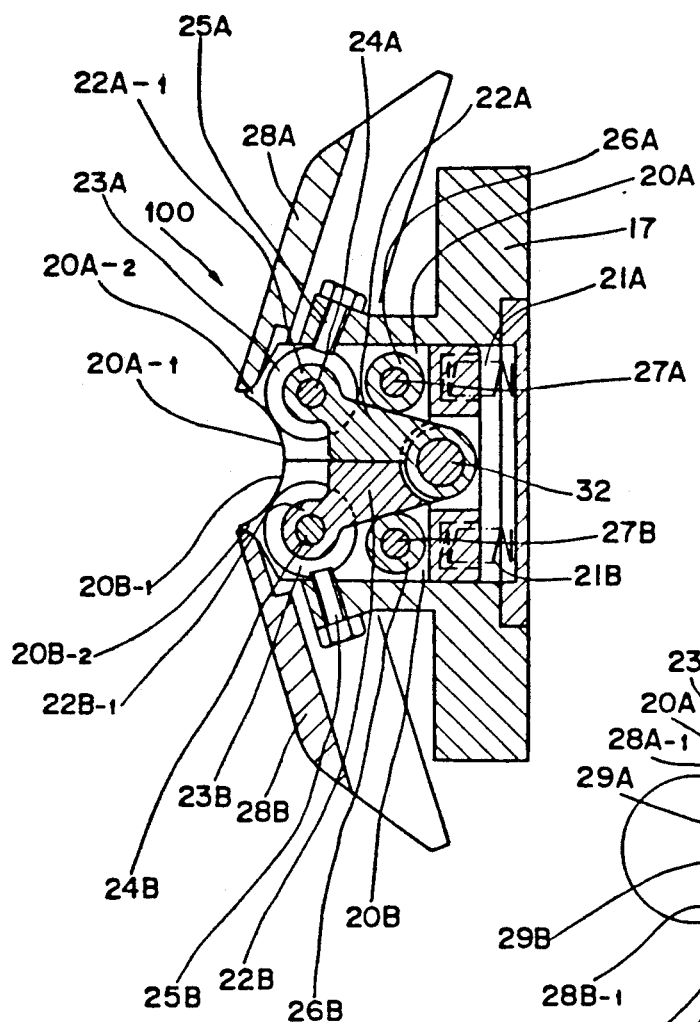
FIG. 5 is a sectional view taken along a line I—I of FIG. 3.

FIG. 5 illustrates the opening and closing mechanism of the work receiving roller and the lock mechanism thereof. A pair of sliders 20A, 20B are urged by the coil springs 21A, 21B and are inwardly engaged slidably into the space provided in the central portion of the main body 17. The front end shapes of the sliders 20A and 20B are curved to continuously form the concave circular arc face on the mutually approaching inner side. The continuous circular arc faces are set in size to come into contact with respect to the outer peripheral face of the small diameter core. The outer side portions from the tip end projection portions 20A-2, 20B-2 of the curved portions 20A-1, 20B-1 are inclined in the opposite direction. A pair of levers 22A, 22B are provided on the inner sides of the sliders 20A, 20B, the rearward end portions of levers 22A, 22B are rotatably mounted on the main body 17 through the shaft 32. The sliders 20A, 20B are idly engaged with respect to the shaft 32, so that the levers 22A and 22B are separately movable. The receiving rollers 23A, 23B for supporting the core are rotatably mounted by the roller support shafts 24A 24B on the front portion of the levers 22A, 22B, and are adapted to move in the direction along which the receiving rollers 23A, 23B in contact are mutually separated when a large diameter core has been selected as the work piece. When the receiving rollers 23A, 23B are moved in the mutual separating direction, they come into contact against the roller bearing portions 22A-1, 22B-1 provided on the levers 22A, 22B. Stoppers 25A, 25B for controlling the movement of the receiving rollers 23A, 23B project from the main body 17.

The lock rollers 26A, 26B are mounted by the shafts 27A, 27B respectively on the sliders 20A, 20B when a small diameter core has been selected. As the lock rollers 26A, 26B are respectively disposed on the external sides of the levers 22A, 22B, the sliders 20A, 20B are urged by the coil springs 21A, 21B, as described hereinabove. The locking of the receiving rollers 23A, 23B is adapted to be effected through the levers 22A, 22B through the wedge operation by the relative movement of the slider 20B and the lever 22B as well as the slider 20A and the lever 22A. Therefore, if the axial direction of movement of the main shaft 6 is effected by the traverse, the opening operations of the levers 22A, 22B are prevented so as to lock the receiving rollers 23A, 23B in a set position in contact with the core outer diameter.

Figure 4B:
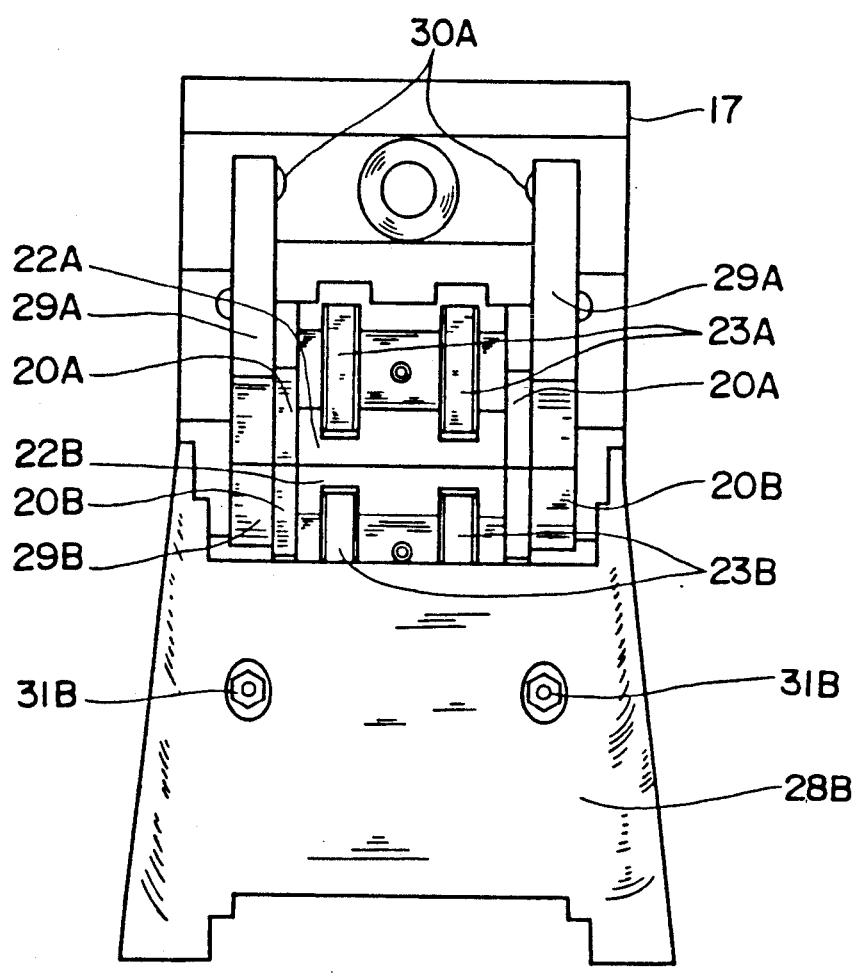
FIG. 4 (A) is a right side face view of FIG. 3.
Figure 6:
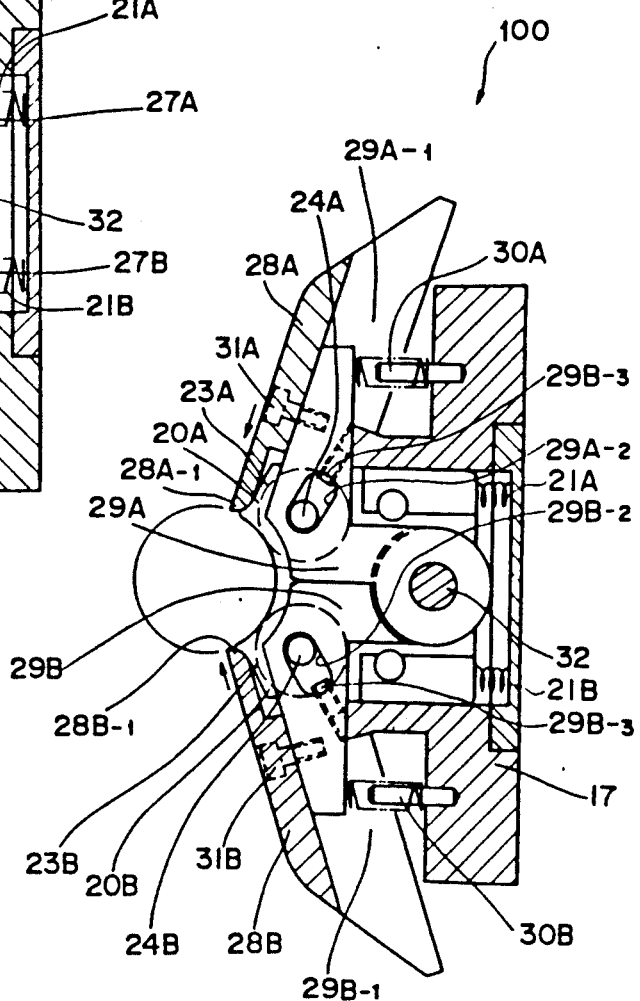
FIG. 6 is a sectional view taken along a line II—II of FIG. 3.

FIG. 6 shows the opening and closing mechanism of the pair of wire guides 28A, 28B (the wire guide 28B only on one side portion is shown in the plane view of FIG. 4 (B)) secured onto the levers 29A, 29B by bolts 31A, 31B on the front end side of the wire guide mechanism 100. The levers 29A, 29B are disposed on the outer sides of the sliders 20A, 20B within the central space of the main body 17, the rear end side is rotatably supported by the shaft 32. The coil springs 30A, 30B are engaged between the front portion collar portions 29A-1, 29B-1, respectively, of the above-described levers 29A, 29B, and the main body 17. The secured wire guides 28A, 28B are urged in the arrow mark direction (the direction the respective ends 28A-1 28B-1 come into contact with the face of the core 1) in the drawing by the spring force. Furthermore, holes 29A-2, 29B-2 are drilled in the levers 29A, 29B, the stopper pins 29A-3, 29B-3 are mounted into the levers 29A, 29B, in the outer end portions of the long holes 29A-2, 29B-2 for free adjustment of the projection in the hole. The roller support shafts 24A, 24B of the receiving rollers 23A, 23B are slidably engaged into the holes 29A-2, 29B-2.

The operation of the above-described first embodiment will be described hereinafter with reference to FIG. 7 through FIG. 10.

Figure 7:
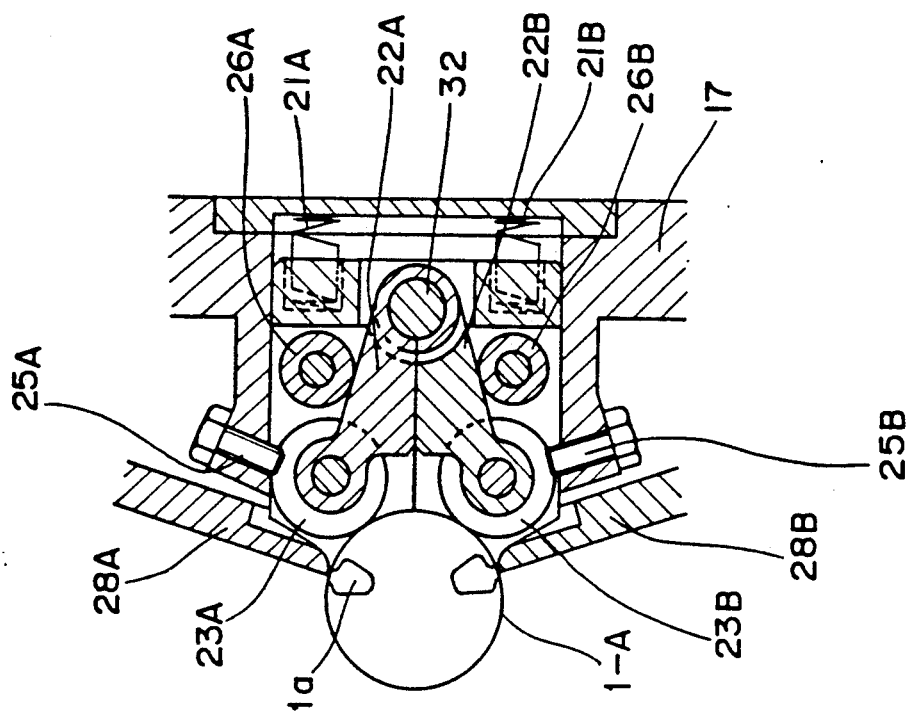
FIG. 7 is an essential portion sectional view showing the set condition of a small diameter core in the first embodiment.

FIG. 7 shows a lock condition of a small diameter core (the armature core of the motor) 1-A, the continuous circular arc faces 20A-1, 20B-1 of the sliders 20A, 20B come into contact in size with the outer peripheral face of the small diameter core 1-A. The receiving rollers 23A, 23B are also in contact with the peripheral face of the small diameter core 1-A. Also, the inner ends 28A-1, 28B-1 of the wire guides 28A, 28B are in contact with the peripheral face of the core A-1, and are respectively positioned in the opening portion of the slot 1a. In the set position of the above-described small diameter core 1-A, the levers 22A, 22B for supporting the receiving rollers 23A, 23B are locked with the wedge operation through the spring force of the coil springs 21A, 21B by the lock rollers 26A, 26B.

Figure 8:
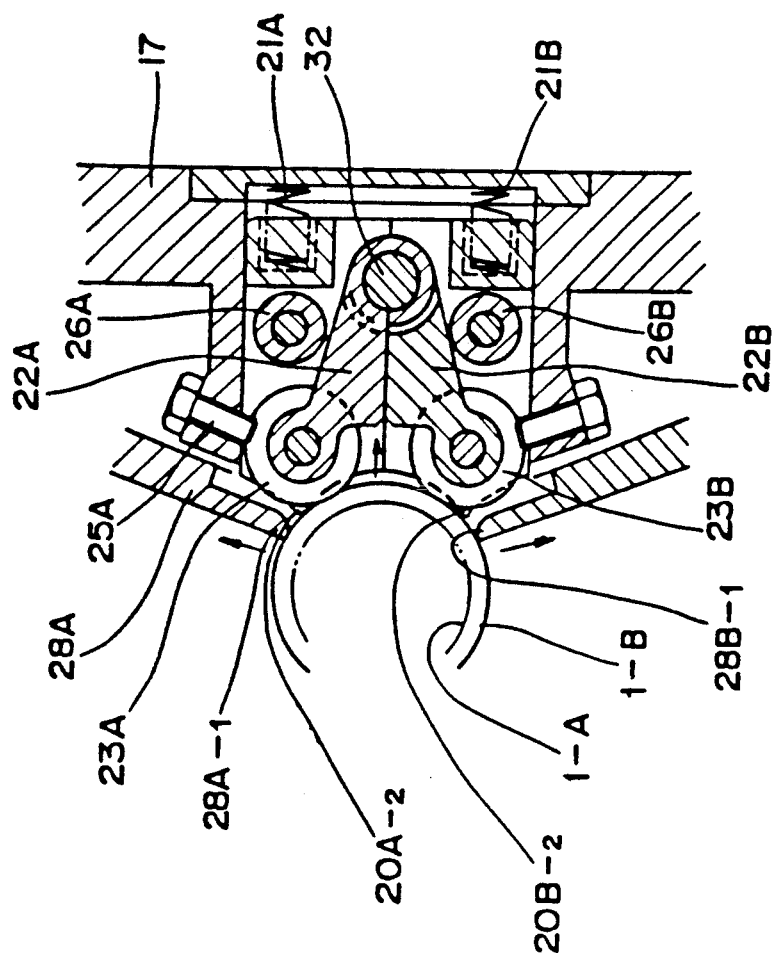
FIG. 8 is an essential portion sectional view showing the approach initial condition of a big diameter core in the first embodiment.

When the large diameter core 1-B is used, instead of the small diameter core 1-A, the core comes into contact with the tip end portions 28A-1, 28B-1 of the wire guides 28A, 28B in the initial condition when the large diameter core 1-B is approached as shown in FIG. 8 and the wire guides 28A, 28B open in contact with it. Then, the tip end portions 20A-2, 20B-2 of the sliders 20A, 20B come into contact with the outer peripheral face of the large diameter core 1-B, so that the sliders 20A, 20B urged by the coil springs 21A, 21B through the contact retreats against the elastic force. The lock rollers 26A, 26B supported by the slider are receded by the retreat of the sliders 20A, 20B, while the levers 22A, 22B do not retreat, so that the clearance between them releases the locks of the levers 22A, 22B.

Figure 9:
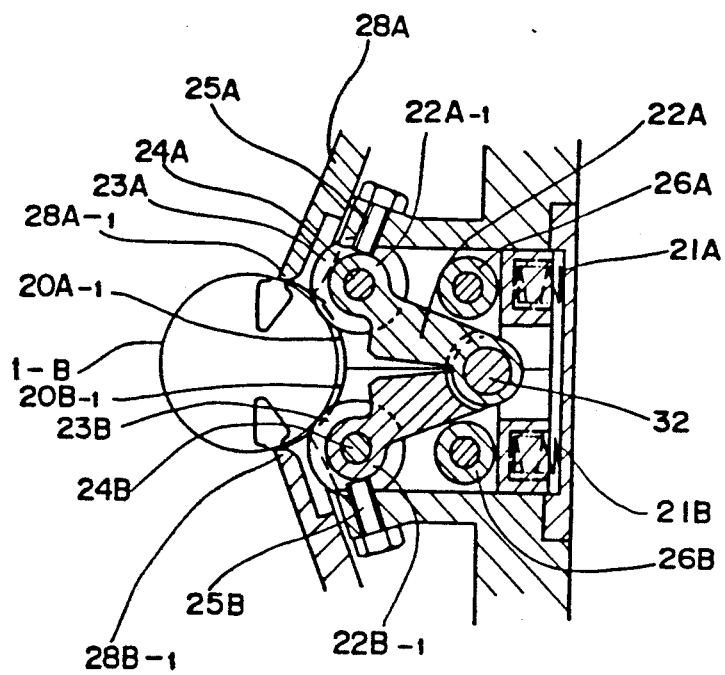
FIG. 9 and FIG. 10 are an essential portion sectional view showing a set completion condition of the large diameter core in the first embodiment.
Figure 10:
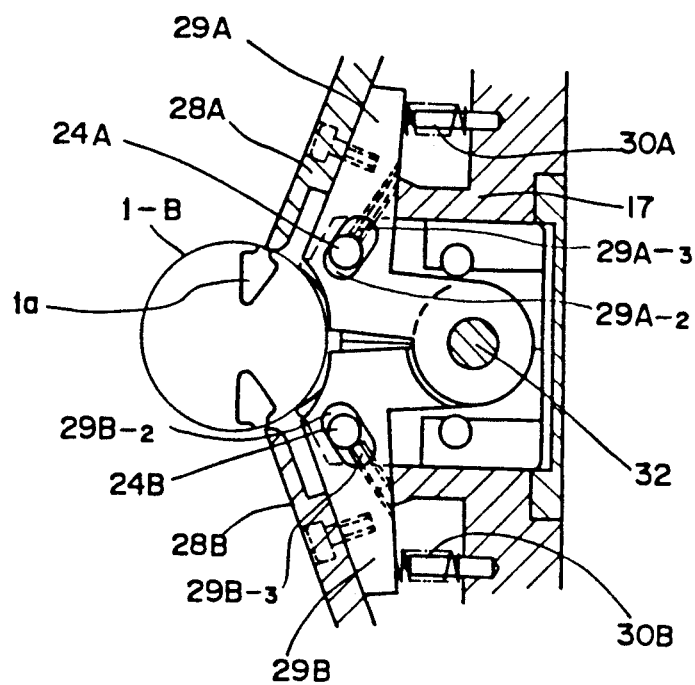
Figure 11:
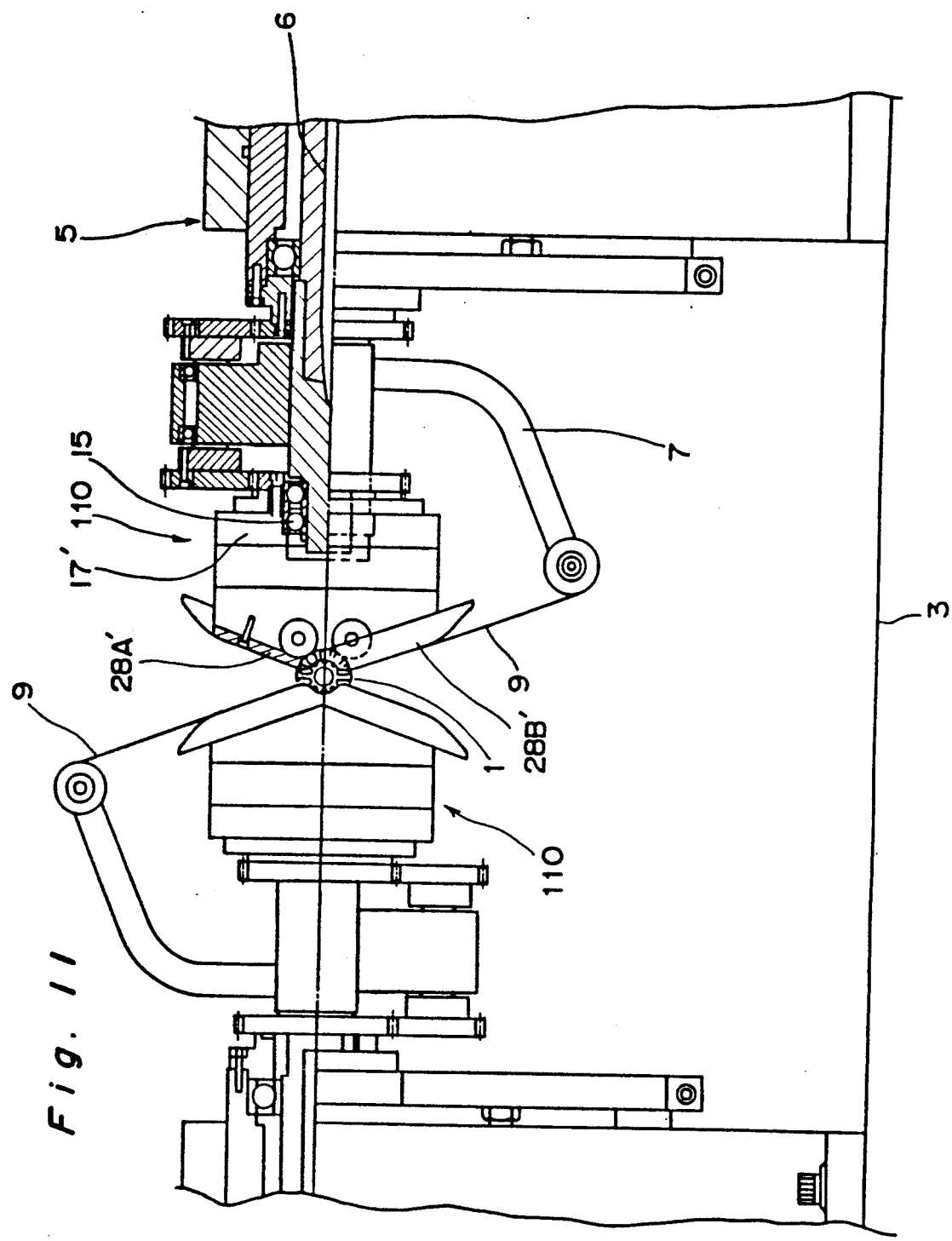
FIG. 11 is a view similar to the above-described FIG. 2 in accordance with the second embodiment of the present invention.
Figure 12:
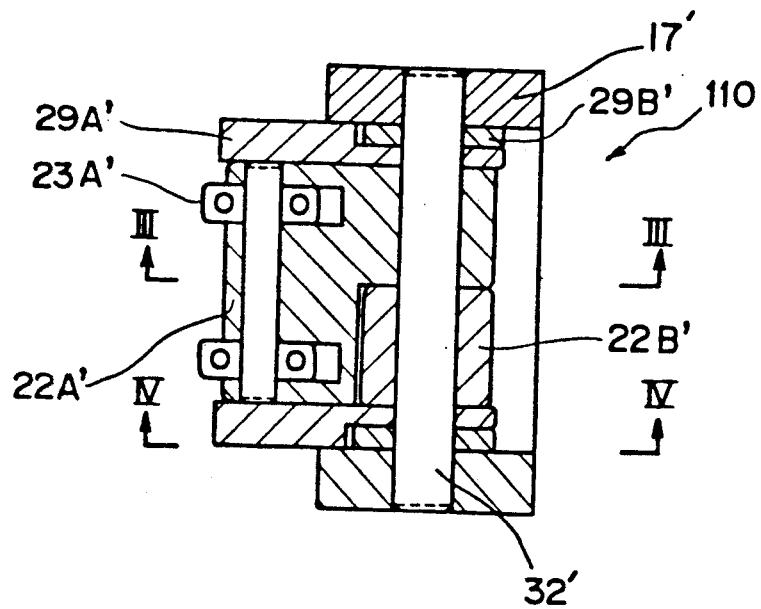
FIG. 12 is a plane view of a wire guiding mechanism of the second embodiment.
Figure 13:
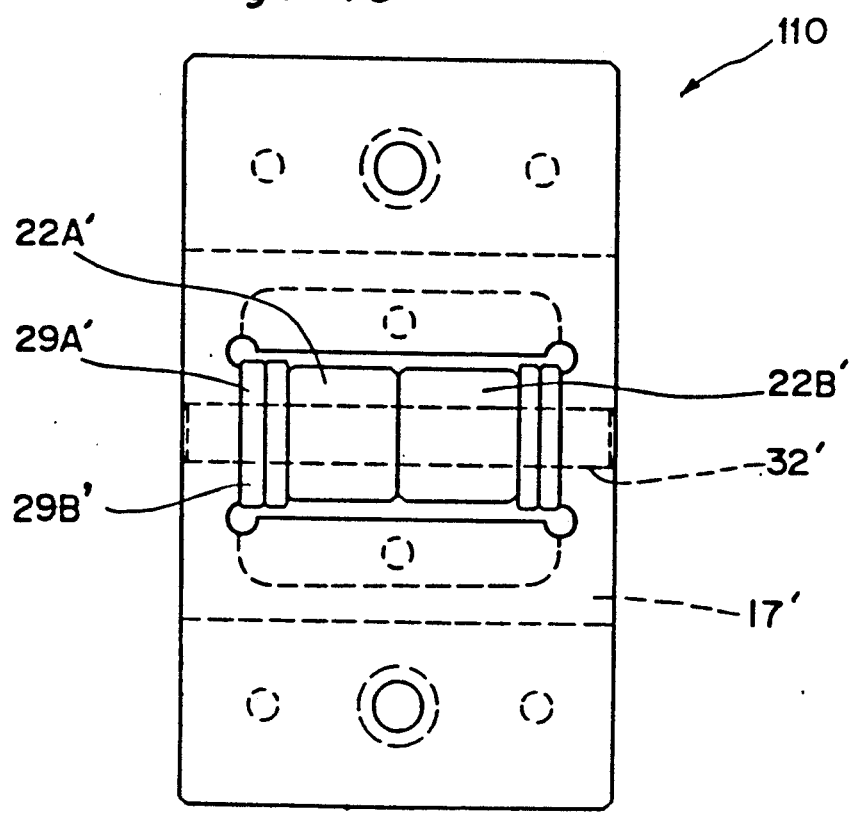
FIG. 13 is a side face view of FIG. 12.
Figure 14:
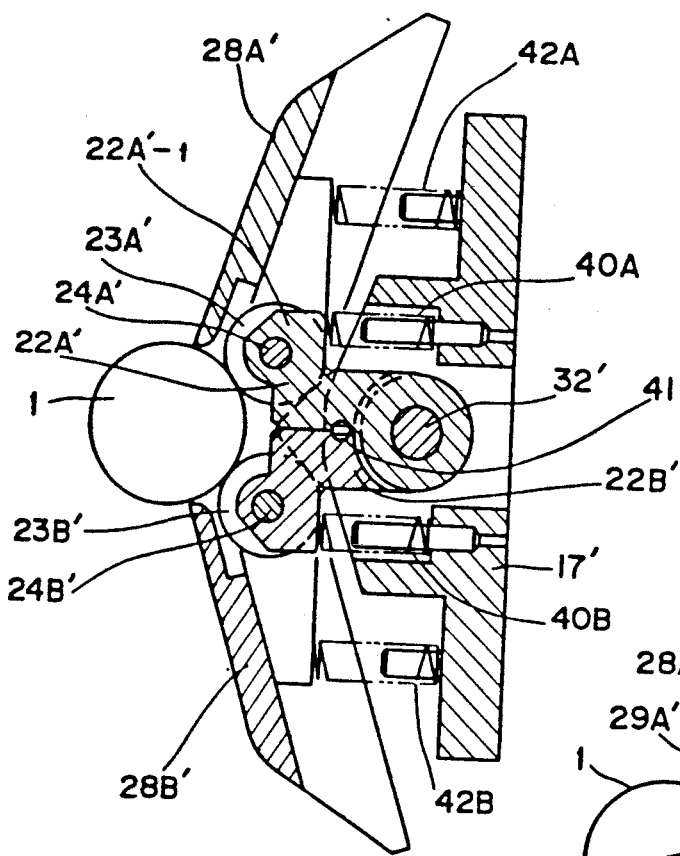
FIG. 14 is a sectional view taken along a line III—III of FIG. 12.
Figure 15:
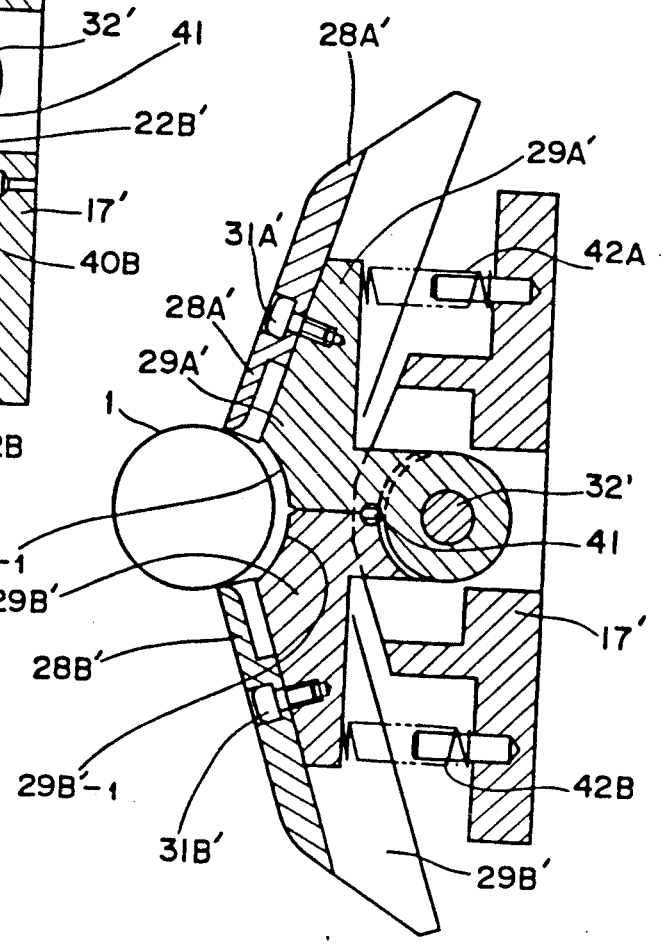
FIG. 15 is a sectional view taken along a line IV—IV of FIG. 12.

In the above-described condition, the main body 17 itself is advanced by a spring 19 to cause the receiving rollers 23A, 23B to move into contact with the outer peripheral face of the core 1-B. Since the receiving rollers 23A, 23B and the levers 22A, 22B are released in the lock by the lock rollers 26A, 26B as described hereinabove, the rollers 23A, 23B are opened so as to trace the outer peripheral face of the core 1-B. As shown in FIG. 9, the movement stops when the bearing portions 22A-1, 22B-1 of the levers 22A, 22B come into contact with the stopper 25A, 25B for the large diameter core as shown in FIG. 9. In the stop condition, the receiving rollers 23A, 23B remain in pressure contact with the outer peripheral face of the large core 1-B, and also, the tip end projection portions 20A-2, 20B-2 of the sliders 20A, 20B also come into contact with the outer peripheral face of the large diameter core 1-B so as to support it.

The wire guides 28A, 28B open in contact with the outer peripheral face of the core 1-B in the initial condition, but are urged by the coil springs 30A, 30B at the setting time to try to move in the closing direction. The pins 29A-3, 29B-3, projected into the holes 29A-2, 29B-2, come into contact against the roller support shafts 24A, 24B which are in engagement with the holes to provide a stop position. In the stop positions, the inner ends 28A-1, 28B-1 of the wire guides 28A, 28B are retained at an optimum distance having a clearance with respect to the outer peripheral face of the core 1-B. Thus, the clearance may be set by the adjustment of the positions of the pins 29A-3, 29B-3.

After the completion of the winding of the wire 9, the sliders 20A, 20B advance by the spring force of the coil springs 21A, 21B when the main body 17 retreats, and are reversed into the positions shown in FIG. 7.

As described hereinabove, in the first embodiment, the core, on which the wire is to be wound, can be either the small diameter core and the large diameter core and each can be retained by the same apparatus so that the wire may be guided in the winding of the wire.

FIG. 11 through FIG. 19 show a second embodiment of the present invention, in the second embodiment the flier 7 does not traverse in the axial direction at the wire winding time, and may be used in accordance with a non-stage variation of the outer diameter of the armature core.

It is to be noted that the same members as those of the first embodiment are given the same reference characters to omit the description.

In the wire guide mechanism 110 in the second embodiment, the main body 17' is rotatably mounted through the bearing 15 with respect to the main shaft 6, is secured with respect to the axial direction, and is adapted to move forward and backward together with the main shaft 6 only during the exchange of the core 1.

In the central opening portion of the main body 17', the respective rear end portions of a pair of levers 22A', 22B' and a pair of levers 29A', 29B' are rotatably supported on the main body 17' through the common shaft 32'.

The receiving rollers 23A', 23B' are rotatably supported on the front end portions of the levers 22A', 22B' through the roller support shafts 24A', 24B' and coil springs 40A, 40B are interposed between the collar portions 22A'-1, 22B'-1 on the front end side and the main body 17' and are urged in a direction to close the levers 22A', 22B'. A stop shaft 41 is fixedly provided on the main body 17', between the levers 22A' and 22B', and the levers 22A', 22B' come to a stop position shown in FIG. 14. Also, the wire guides 28A', 28B' are secured by the bolts 31A', 31B' onto the pair of levers 29A', 29B' and the coil springs 42A, 42B are contacted between the levers 29A', 29B' and the main body 17'. Accordingly, the guides 28A', 28B' are also urged in the closing direction, and are stopped by the stopper shaft 41. The inner side front end portions of the levers 29A', 29B' are circular arc concaved portions 29A'-1, 29B'-1 as shown, and the levers 29A', 29B' are set to be engaged with the outer face of the minimum diameter core in a condition where the concaved portions are continuous in the closed condition.

The operation of the second embodiment will be described hereinafter.

Figure 16:
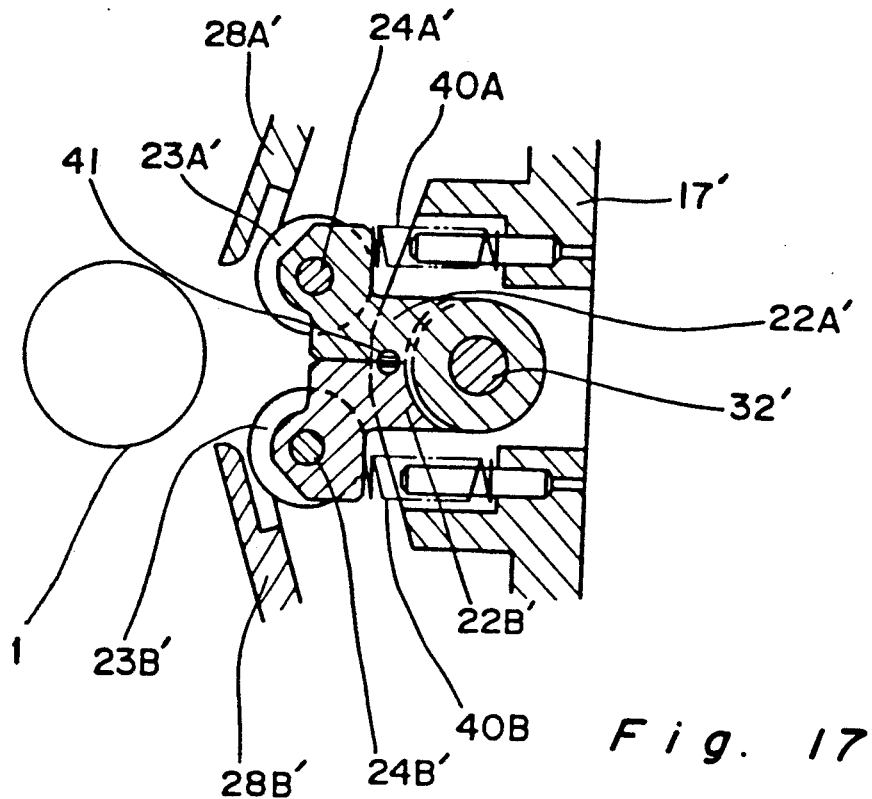
FIG. 16 and FIG. 17 are sectional views similar to those of FIG. 14 and FIG. 15 showing the condition before the core contact is provided in the second embodiment.
Figure 17:
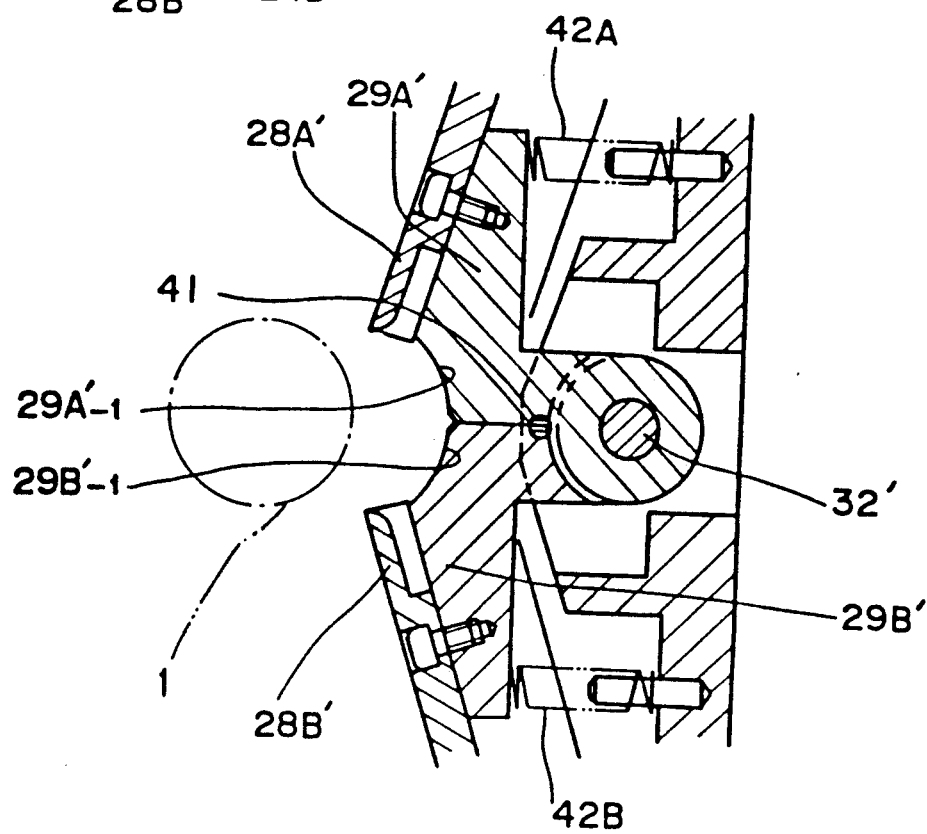

FIG. 16 and FIG. 17 show a condition where the receiving rollers 23A', 23B' and the wire guides 28A', 28B' are not in contact with respect to the core 1. The receiving rollers 23A', 23B' are urged onto the closed side by the coil springs 40A, 40B, and the wire guides 28A', 28B' are urged onto the closed side by the coil springs 42A, 42B and are normally stopped in the constant positions by the stopper shaft 41.

Figure 18:
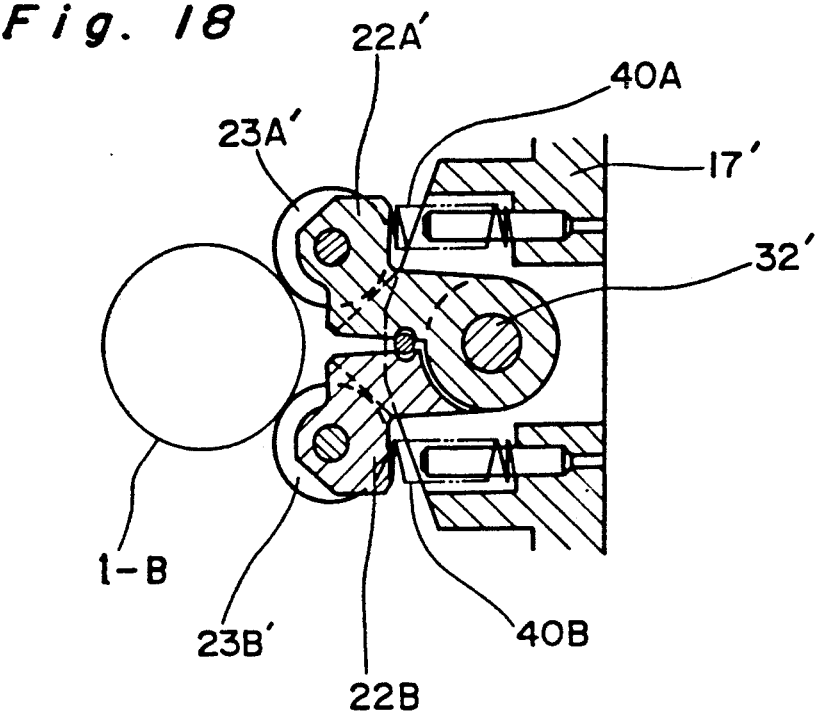
FIG. 18 and FIG. 19 are sectional views similar to those of FIG. 14 and FIG. 15 showing the condition where the core is set in the second embodiment.
Figure 19:
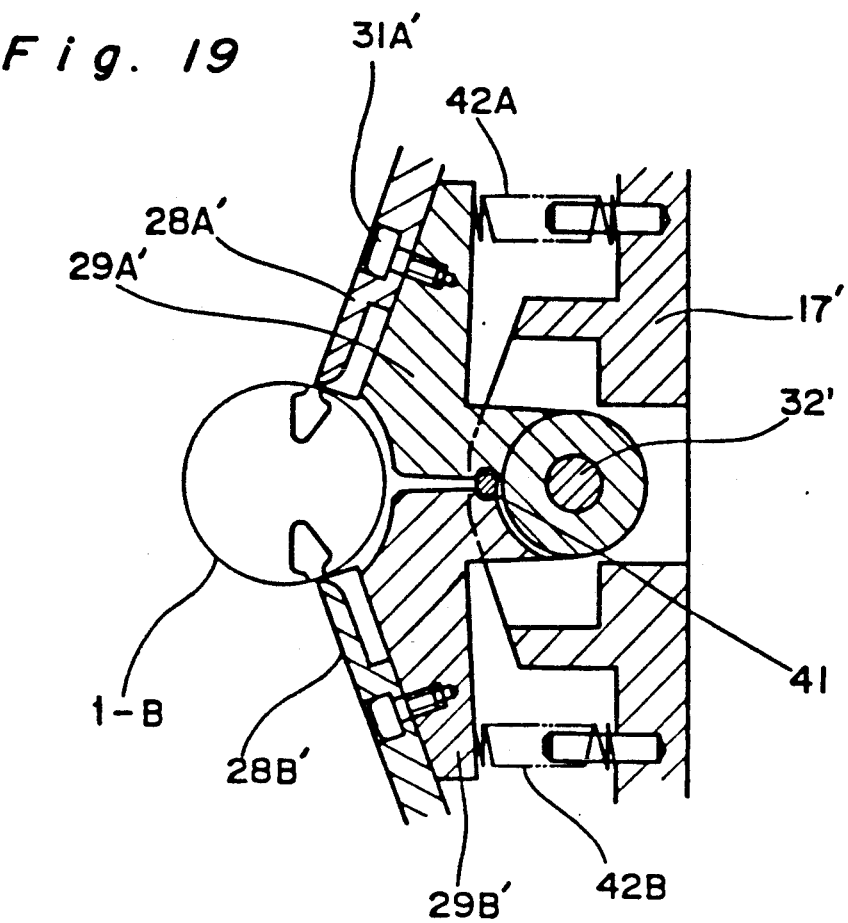

FIG. 18 and FIG. 19 show an operating condition with respect to the core 1. At the setting time, the present wire guide mechanism 110 is advanced to the set position by the main shaft 6, the receiving rollers 23A', 23B' and the wire guides 28A', 28B' come into contact with the outer peripheral face of the core 1 so as to open against the spring force of the coil springs 40A, 40B and 42A, 42B in accordance with the core outer diameter. The receiving rollers 23A', 23B' are urged by the coil springs 40A, 40B to retain the core through the pressure contact. Also, the wire guides 28A', 28B' are urged by the coil springs 42A, 42B and are set in positions where the tip end portions thereof meet the slots 1a of the outer peripheral face of the core 1.

According to the wire guide apparatus in the coil winding machine of the above-described construction, the wire guide mechanism is divided so as to be vertically opened and closed. The receiving roller and the wire guide are urged by the coil spring to set the core, so that the outer diameter of the core may correspond even when the outer diameter of the core has been changed.

Figure 21:
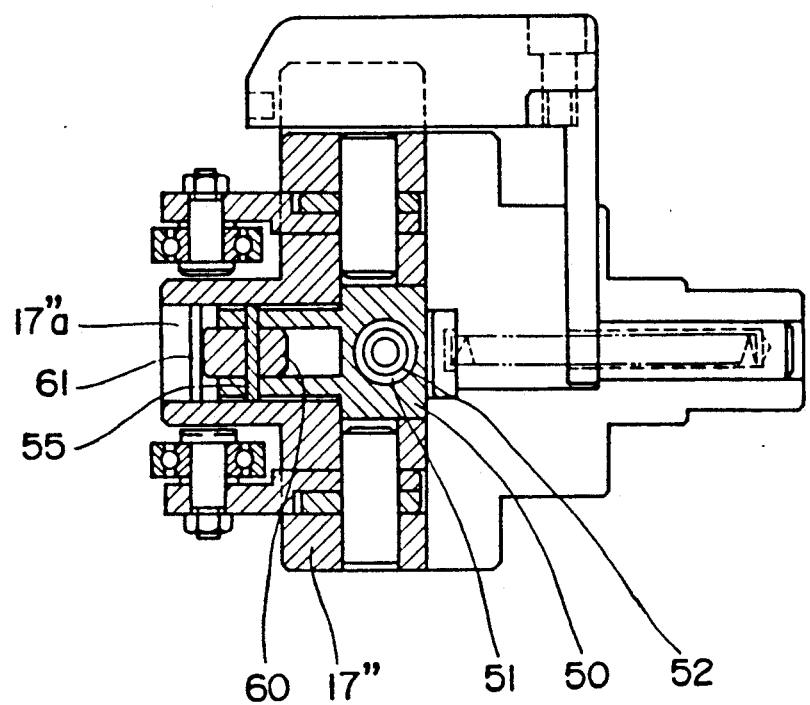
FIG. 21 is a sectional view of FIG. 20.
Figure 20:
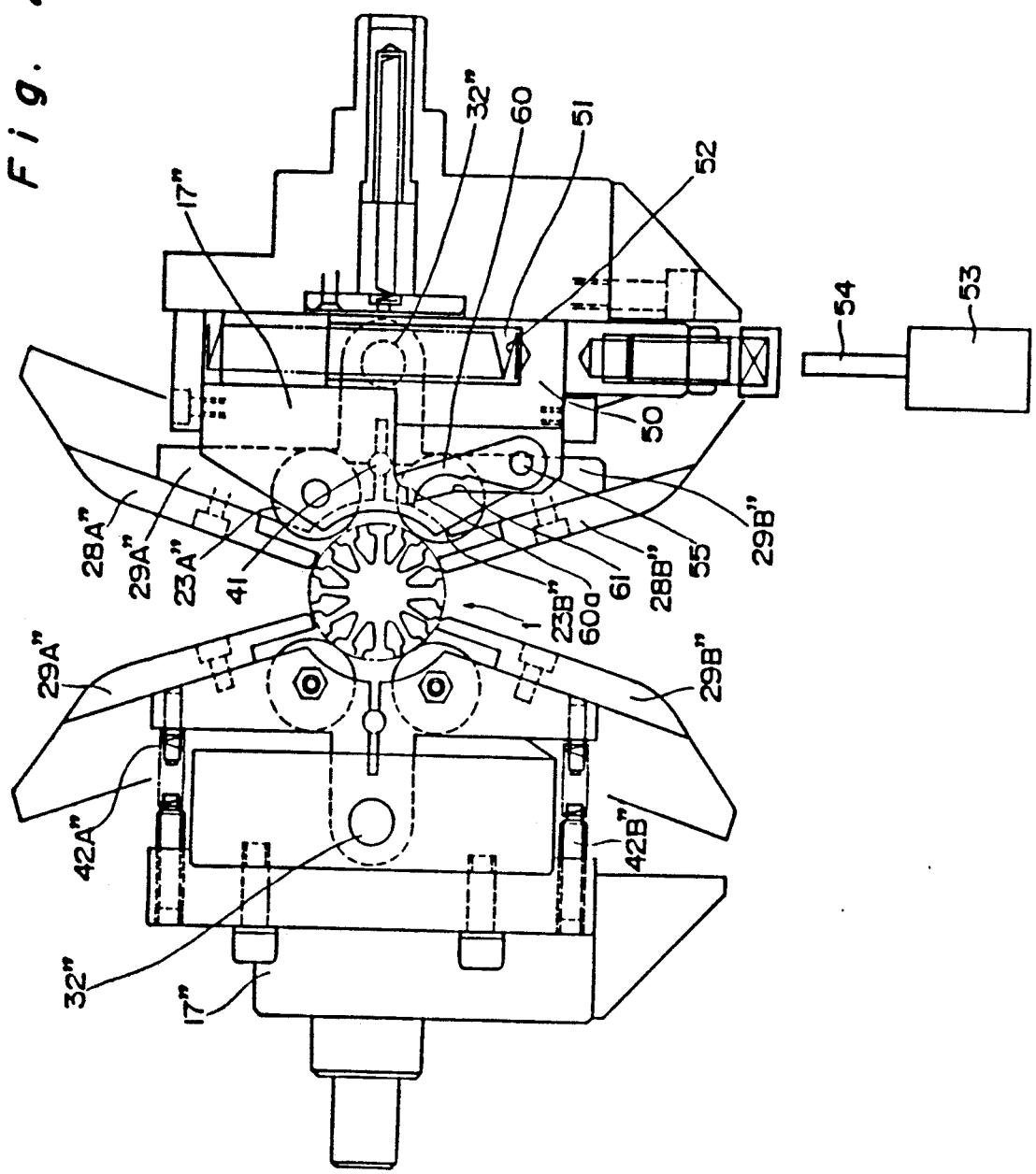
FIG. 20 is a partial sectional whole front face view showing a third embodiment of the present invention.
Figure 22:
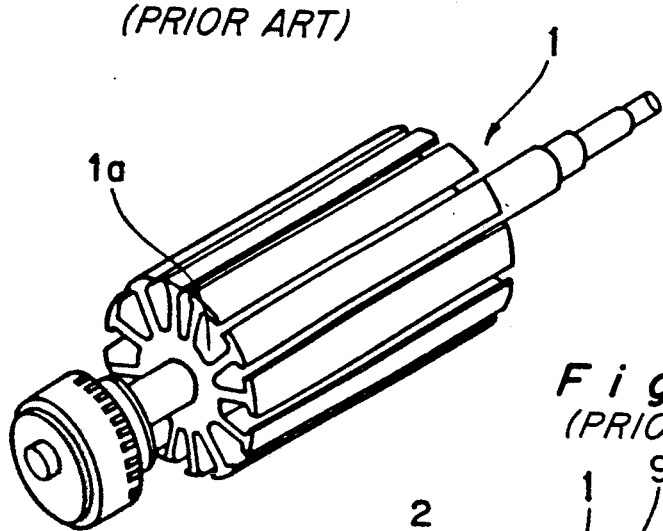
FIG. 22 is a perspective view showing an armature core of a motor which becomes a work of the present invention.

FIG. 20 and FIG. 21 show a third embodiment of the present invention. Although in the first embodiment and the second embodiment, the core is set in a condition where the slot of the core conforms to the tip end portion of the wire guide. Accordingly, in the present embodiment, a position conforming pawl apparatus is provided for causing the slot position of the core to conform to the tip end portion of the wire guide is provided.

Namely, a notch portion 17"a is provided at the central portion of the main body 17", with a pawl support member 50 being engaged into the notch portion 17"a. A spring accommodating portion 51, cut from the middle upper end in FIG. 20, is formed in the pawl support member 50 and a spring 52 is contracted into the spring accommodating portion 51 so as to urge the pawl support portion member 50 downwardly, as shown in the drawing. A rod 54 of an actuator 53 which is raised, in the drawing, against the spring 52 is disposed oppositely on the pawl support member 50, the pawl support member 50 being raised with the tip end of the rod 54 being in contact with the pawl support member 50 at the actuator driving time. A position conforming pawl 60 of such a shape as shown in FIG. 20 is mounted on the pawl support member 50 by the shaft 55, and the pawl 60 is urged onto the front end side by the coil spring (not shown) mounted on the shaft 55. A guide portion 61 is formed at a position where the tip end portion of the position conforming pawl 60 comes into contact, in the notch portion 17"a with the pawl support member 50 engaged therewith. When the pawl support member 50 is raised by the actuator 53, the pawl 60 rises along the guide portion 61. The tip end 60a of the pawl 60 is projected from the notch portion 17"a to come into contact with the outer peripheral face of the core so as to slide the core outer peripheral face in contact so that the pawl front end 60a is inserted into the slot 1a. In this condition, the other slot comes into contact with the inner ends of the wire guides 28A", 28B", so that the positional conformity between the slot and the wire guide is provided.

It is to be noted that the other constructions are almost similar to those of the above-described second embodiment, so that the similar reference characters are given to omit the description.

As is clear from the foregoing description, according to the wire guiding apparatus in a coil winding machine of the present invention, where the diameter of the motor core is changed, in order to wind the wire around the receiving roller for supporting the iron core, the wire guide for guiding the wire from the flier may be automatically opened and closed respectively in accordance with the work diameter, and may be stopped in a lock condition in the given position corresponding to the core diameter.

Therefore, there are various advantages in that the same wire guiding apparatus may be used without exchange independently of the size of the core diameter, the operation efficiency may be increased, and so on.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wire guiding apparatus in a coil winding machine which is adapted to wind continuously by a flier a wire around an armature iron core with a slot provided therein, comprising
   a pair of wire guide means for guiding the wire into the slot of the iron core by the flier,
   wire guide lever means for opening and closing the wire guide means in accordance with the outer diameter variation of the iron core to set the wire guide means at the position of the slot of the iron core, and
   work receiver means adapted to be traced in contact with the outer peripheral face of the iron core so as to be open and close on engagement with the iron core.

2. The wire guiding apparatus as defined in claim 1, wherein the work receiver means includes a pair of first lever members rotatably mounted so as to be able to open and close, a receiving roller rotatably supported at a top end of the first lever members and in contact with the iron core, and first urging means for applying an urging force in a direction to close the first lever members.

3. The wire guiding apparatus as defined in claim 2, wherein the work receiver means further includes a stopper shaft provided on the first lever member contact portion at a closing position of the first lever member to secure the closing position at all times.

4. The wire guiding apparatus as defined in claim 1, wherein the wire guide lever means includes a pair of second lever members rotatably mounted so as to open and close, and a second urging means for applying an urging force in a direction to close the second lever members.

5. The wire guiding apparatus as defined in claim 1, wherein the wire guide lever means includes a pair of second lever members rotatably mounted so as to open and close, and a second urging means for applying an urging force in a direction to close the wire guide lever means.

6. The wire guiding apparatus as defined in claim 4 or claim 5, wherein the wire guide lever means further includes a stopper shaft provided on the first lever member contact portion at a closing position of the second lever member to secure the closing position.

7. A wire guiding apparatus in a coil winding machine which is adapted to traverse a main shaft fixedly mounting a flier thereon in an axial direction for continuously winding of a wire around an armature iron core with a slot provided therein, comprising
   a pair of wire guide means for guiding the wire into the slot of the iron core by the flier,
   wire guide lever means for opening and closing the wire guide means in accordance with the outer diameter variation of the iron core to set the wire guide means at the position of the slot of the iron core,
   work receiver means adapted to be traced in contact with the outer peripheral face of the iron core so as to open and close on engagement with the iron core, and
   a lock mechanism for holding a predetermined position of the work receiver means with respect to movement in the axial direction.

8. The wire guiding apparatus as defined in claim 7, wherein the work receiver means includes a pair of first lever members rotatably mounted so as to be able to open and close, a receiving roller rotatably supported at a top end of the first lever members and in contact with the iron core, and first urging means for applying an urging force in a direction to close the first lever member.

9. The wire guiding apparatus as defined in claim 8, wherein the work receiver means further includes a opening position adjusting means for adjusting the opening position of the first lever member.

10. The wire guiding apparatus as defined in claim 9, wherein adjusting of the opening position adjusting means is by movement of a bolt.

11. The wire guiding apparatus as defined in claim 7, wherein the wire guide lever means includes a pair of second lever members rotatably mounted so as to open and close, and a second urging means for applying an urging force in a direction to close the second lever member.

12. The wire guiding apparatus as defined in claim 11, wherein the wire guide lever means includes long holes at the top end portions of the second lever members, respectively, an extending portion of a shaft being provided in a receiving roller and passing through a corresponding one of the long holes, movement of the extending portion of the shaft being controlled so as to adjust a clearance between the wire guide means and the outer periphery of the iron core.

13. The wire guiding apparatus as defined in claim 7, wherein the wire guide lever means includes a pair of second lever members rotatably mounted so as to open and close, and a second urging means for applying an urging force in a direction to close the wire guide lever means.

14. The wire guiding apparatus as defined in claim 13, wherein the wire guide lever means includes long holes at the top end portions of the second lever members, respectively, an extending portion of a shaft being provided in a receiving roller and passing through a corresponding one of the long holes, movement of the extending portion of the shaft being controlled so as to adjust a clearance between the wire guide means and the outer periphery of the iron core.

15. The wire guiding apparatus as defined in claim 7, including a main body the lock mechanism having a slider provided for sliding movement in the axial direction with respect to the main body, a pair of lock rollers mounted rotatably onto the slider with a space therebetween, a pair of first lever members having a shape of a wedge therebetween and provided between the corresponding lock rollers, and means provided between the main body and the slider for providing an urging force so as to close the first lever members by means of the lock rollers.

16. The wire guiding apparatus as defined in claim 15, wherein pair of the lock rollers is divided so that each lock roller of the pair of lock rollers is slidable independently with respect to the main body.

17. A wire guiding apparatus in a coil winding machine adapted to continuously wind a wire around an armature iron core provided with a slot therein, wherein a pair of receiving rollers contact sides of the iron core, the pair of receiving rollers being mounted on work receiver means for opening and closing, the receiving rollers being adapted to contact the outer peripheral face of the iron core so as to open and close and to be locked in a set position of the iron core when an outer diameter of the iron core has been varied, and a pair of wire guides for guiding the wire into the slot of the iron core, the wire guides being opened and closed in accordance with the outer diameter variation of the iron core so as to conform to the slot position of the iron core.

18. A wire guiding apparatus in a coil winding machine described in accordance with the claim 17, wherein a pair of receiving rollers and a pair of wire guides are provided respectively on both sides of the armature iron core, the respective receiving rollers being rotatably supported through shafts by front ends of one pair of levers, ends of the levers rotatably mounted on a main body by a common shaft so that the receiving rollers provided on the front end may open and close in accordance with the core diameter, the wire guides being mounted on the front ends of the pair of levers, the end portion of the levers is pivotally mounted on the main body by the common shaft so as to allow the wire guides to trace the outer diameter of the core, holes being provided in the lever mounted in the wire guides with a shaft of the receiving roller slidably engaged in the holes so that the shaft of the receiving roller comes into contact with one end of the holes so as to stop, with a clearance, in a required position where the tip end of the wire guide is in alignment with the slot of the iron core.

19. A wire guiding apparatus in a coil winding machine described in accordance with the claim 17, wherein a coil winding machine the main shaft traverses in the axial direction, the main body of the wire guide apparatus being mounted through a pin and a spring with respect to a support plate mounted on the main shaft, the position with respect to the receiver roller and the wire guide core outer diameter during the axial direction of movement of the main shaft being maintained in a predetermined relationship.

* * * * *